US008692516B2

(12) United States Patent
Nork et al.

(10) Patent No.: US 8,692,516 B2
(45) Date of Patent: Apr. 8, 2014

(54) STACKABLE BI-DIRECTIONAL MULTICELL BATTERY BALANCER

(75) Inventors: Samuel H. Nork, Andover, MA (US); Mark R. Vitunic, Lexington, MA (US)

(73) Assignee: Linear Technology Corporation, Milpitas, CA (US)

(*) Notice: Subject to any disclaimer, the term of this patent is extended or adjusted under 35 U.S.C. 154(b) by 367 days.

(21) Appl. No.: 13/242,836

(22) Filed: Sep. 23, 2011

(65) Prior Publication Data

US 2013/0076309 A1    Mar. 28, 2013

(51) Int. Cl.
*H02J 7/00*    (2006.01)
(52) U.S. Cl.
USPC ........................ 320/118; 320/134; 320/136
(58) Field of Classification Search
USPC ............................................ 320/118
See application file for complete search history.

(56) References Cited

U.S. PATENT DOCUMENTS

| 5,631,534 | A |   | 5/1997 | Lewis |  |
|---|---|---|---|---|---|
| 5,656,915 | A |   | 8/1997 | Eaves |  |
| 5,905,360 | A | * | 5/1999 | Ukita | 320/118 |
| 5,920,179 | A | * | 7/1999 | Pedicini | 320/122 |
| 6,114,835 | A | * | 9/2000 | Price | 320/118 |
| 7,622,893 | B2 |   | 11/2009 | Williams |  |
| 2004/0135545 | A1 | * | 7/2004 | Fowler et al. | 320/118 |
| 2010/0148726 | A1 |   | 6/2010 | Lee et al. |  |
| 2011/0076525 | A1 |   | 3/2011 | Zhang et al. |  |
| 2012/0049801 | A1 | * | 3/2012 | Chang | 320/132 |
| 2012/0249052 | A1 | * | 10/2012 | Milios | 320/106 |

FOREIGN PATENT DOCUMENTS

| JP | 2009-71936 | 4/2009 |
|---|---|---|
| JP | 2010-529817 A | 8/2010 |

OTHER PUBLICATIONS

Korean Office Action issued in Application No. 10-2012-0064126 dated Jun. 4, 2013.
European Search Report EP 12 00 7270 dated Feb. 20, 2013.

* cited by examiner

*Primary Examiner* — Arun Williams
(74) *Attorney, Agent, or Firm* — Schiff Hardin LLP

(57) ABSTRACT

A battery balancing system includes at least one sub-stack, each sub-stack comprising a plurality of cells connected in series. The system also includes a balancing module for each sub-stack comprising an independent bidirectional balancer for each cell in the sub-stack. The system includes a daisy chained stackable serial port. The balancing system senses a state of charge (SOC) of each cell in each sub-stack. The average SOC of the sub-stack is determined. For a weak cell, additional charge is provided from its respective sub-stack during the discharging of the battery. For a strong cell, additional charge is removed and provided to its respective sub-stack during discharging of the battery. Any number of sub-stacks can be stacked in series while maintaining the same serial control, allowing a theoretically unlimited number of cells to be supported from a single communication port without the need for additional digital isolators.

15 Claims, 6 Drawing Sheets

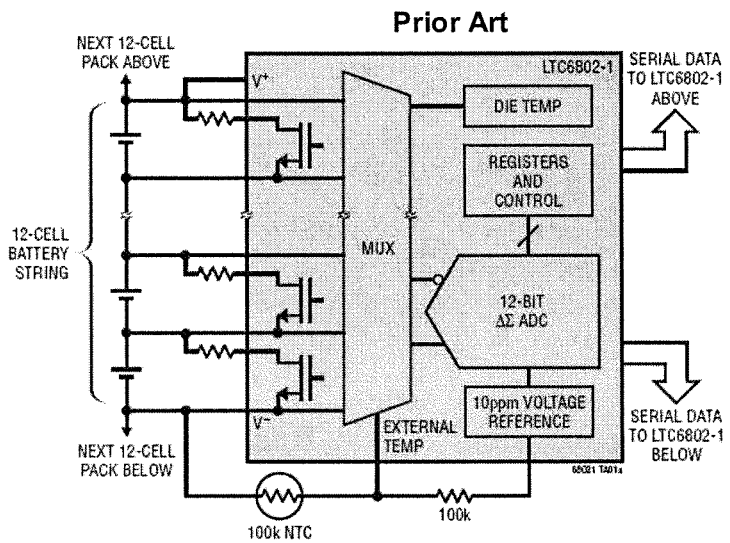
FIG. 1
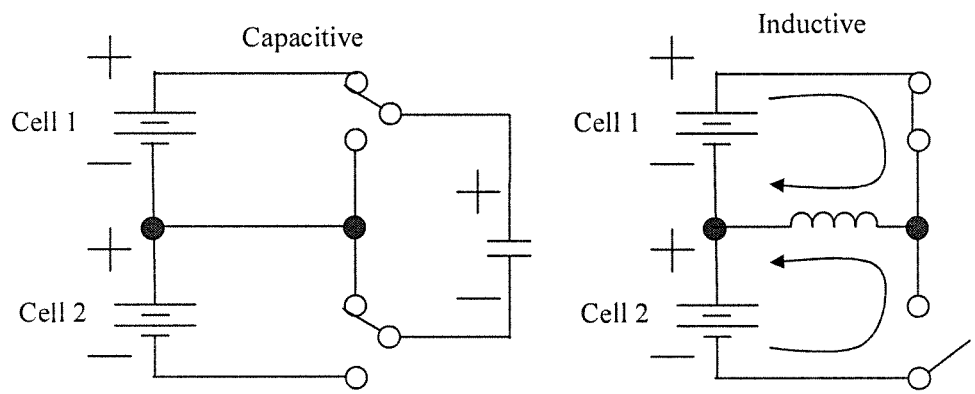
FIG. 2a
FIG. 2b

STACKABLE BI-DIRECTIONAL MULTICELL BATTERY BALANCER

TECHNICAL FIELD

This disclosure generally relates to the electrical arts, and more particularly, to concepts and techniques for balancing power sources.

DESCRIPTION OF RELATED ART

Large, high voltage batteries comprising a plurality of series connected battery cells are commonly used in various applications, including electric vehicles and large industrial battery back-up and grid load leveling applications. Safety and lifetime preservation of the battery packs may require that all cells in the pack be monitored and balanced such that each cell operates in a fixed "state of charge" (SOC) range over the operating life of the battery. If a cell is overcharged, discharged too deeply or rapidly, or simply overheated, it may more readily degrade, catch fire, or even explode.

Since cells are typically not identical, there is a concern of imbalance between the cells. For example, there may be differences in the SOC, cell-discharge rate, impedance, capacity, and temperature characteristics. These differences may exist even if the cells are from the same assembly line. The weak cells (i.e., cells with inherently lower capacity, degraded capacity, or high internal impedance,) may charge and discharge faster than stronger cells. Thus, during a charge, a weak cell may reach a predetermined high voltage faster. Similarly, during a discharge, a weak cell may reach a predetermined low voltage faster. In this regard, the weak cells may be weakened further by relatively long charge and discharge cycles. For cells connected in series, the total useful capacity of the battery (i.e., series of cells) is limited by the weakest cell.

Cell balancing may be performed to equalize the voltage or state of charge on each cell over time to address some of the foregoing concerns. Typically, cell balancing is performed using either passive or active balancing.

FIG. 1 illustrates a circuit with passive balancing. In passive balancing, the cell that may need balancing (i.e., a cell at a higher SOC than the average cell) is discharged such that it conforms to the charge of other cells. However, discharged energy is dissipated as heat. Accordingly, passive balancing is an energy wasteful approach, especially when cell voltages are significantly different from each other.

In active balancing, each cell voltage (e.g., its SOC) may be measured separately. Capacitive or inductive charge transfer may be used to balance the charge in each cell (instead of dissipating the charge as heat). Power efficiency is thereby increased. In this regard, FIGS. 2a and 2b illustrate circuits with capacitive and inductive charge shuttling active balancing, respectively. Neither circuits of FIGS. 2a and 2b are stackable or interleaved.

Further, active balancing systems may be unidirectional. In the unidirectional systems of FIG. 3, charge from a particular cell can be either added or withdrawn, but not both, making them less effective in balancing. Further, active balancing systems of the prior art don't allow balancing of several cells simultaneously, making them less time efficient. In this regard, FIG. 4 illustrates a non-stackable, non-simultaneous bi-directional balancing consistent with a typical prior art approach.

Thus, prior art approaches typically include limitations of zero capacity recovery, high balancing power dissipation, long balancing times, and non-optimal energy recovery. Further, there may be isolated I/O control requirements for large strings of series connected cells.

In view of the foregoing, it would be desirable to have a method and system for a time and energy efficient bidirectional balancing of cells connected in series. It would also be desirable to be able to stack several groups of cells together while still being able to address them through a single serial port.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 illustrates a circuit with passive balancing.

FIG. 2a Illustrates a circuit with non-stackable, non-interleaved capacitive charge shuttling active balancing.

FIG. 2b Illustrates a circuit with non-stackable, non-interleaved inductive charge shuttling active balancing.

DETAILED DESCRIPTION OF ILLUSTRATIVE EMBODIMENTS

Figure 3:
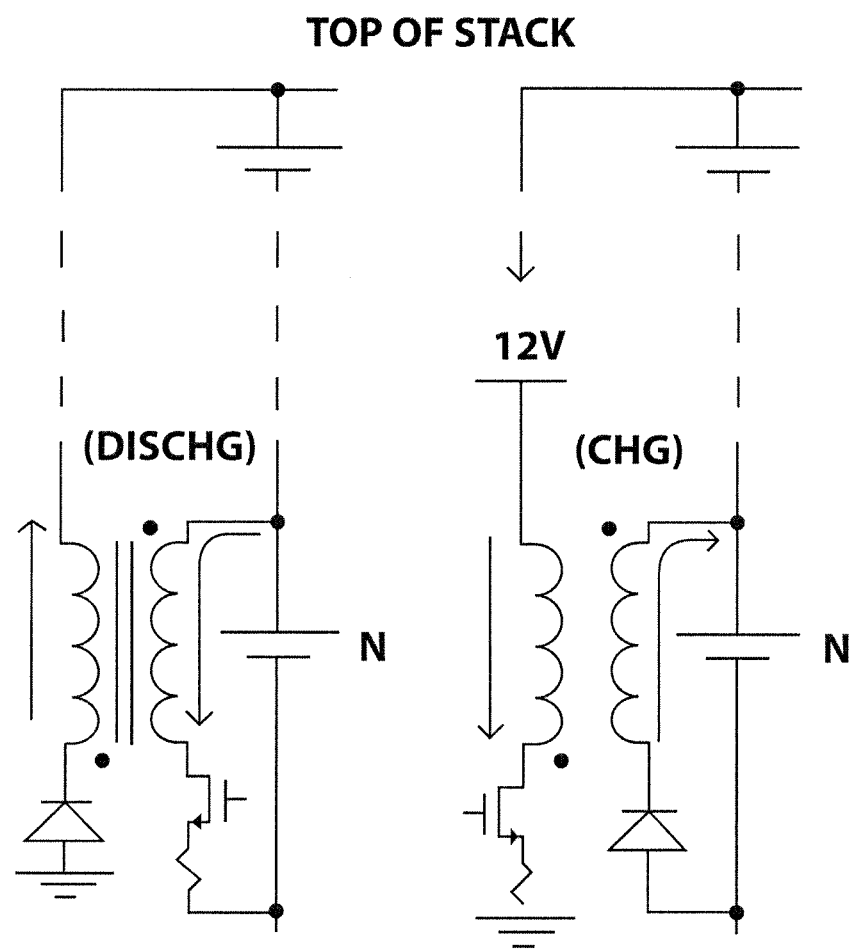
FIG. 3 Illustrates two circuits with unidirectional isolated flyback balancing.
Figure 4:
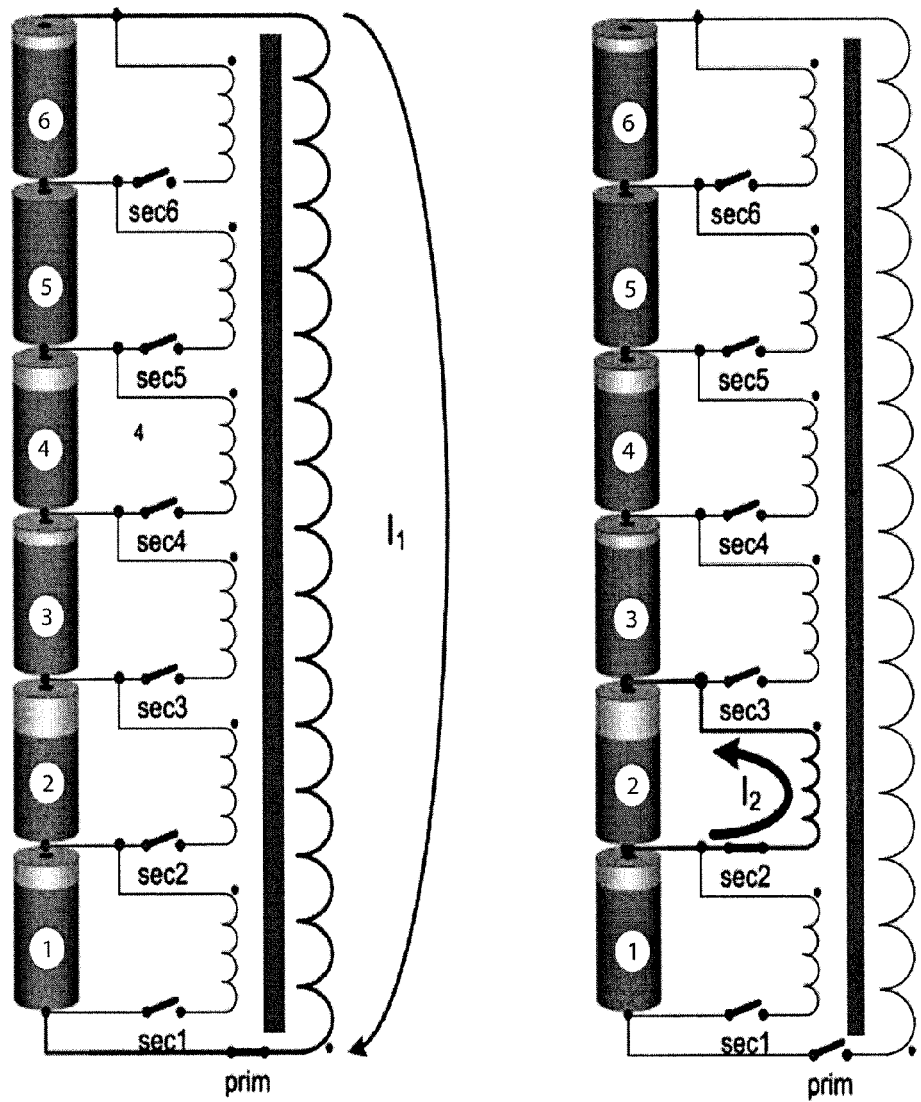
FIG. 4 Illustrates a circuit with non-simultaneous bi-directional balancing.
Figure 5:
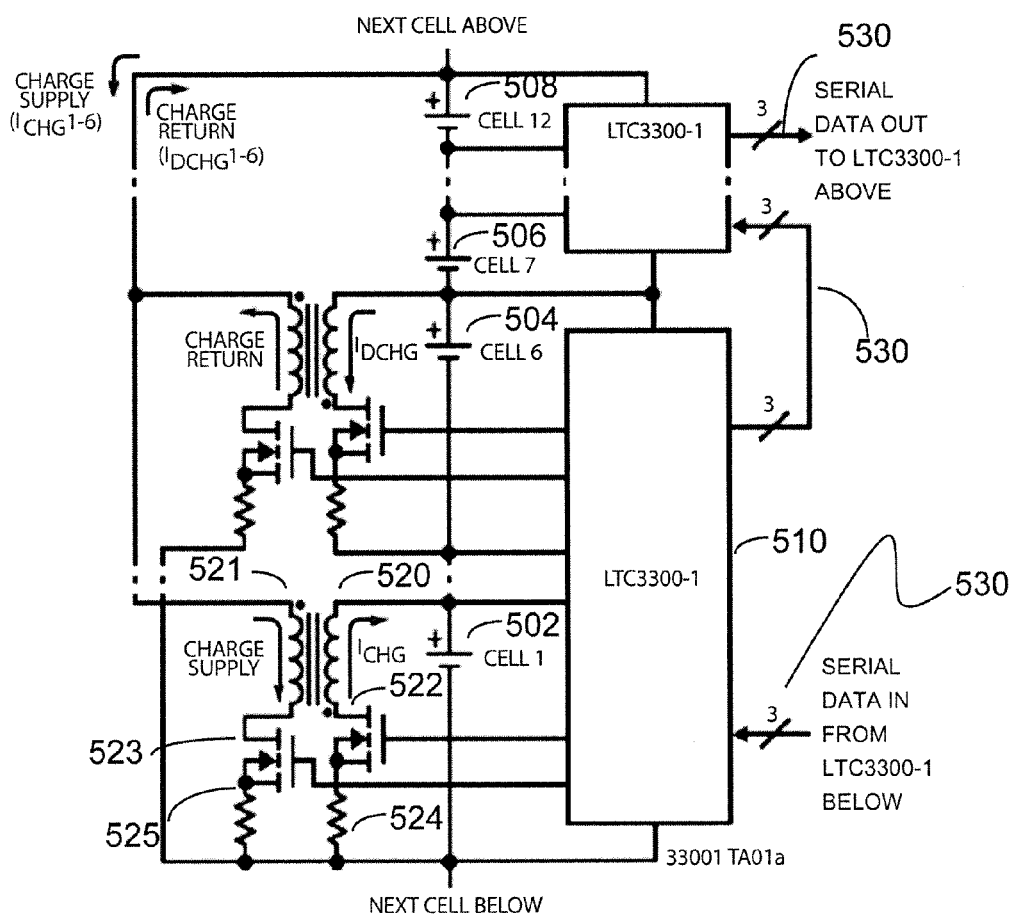
FIG. 5 Illustrates a circuit with a 6-cell bi-directional balancer consistent with an embodiment of the invention.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described, FIG. 5 Illustrates a circuit with transformer connections for balancing a plurality of battery stacks, consistent with an embodiment of the invention. A plurality of cells (i.e., 502 to 508) may be stacked on top of one-another in series. The balancing module 510 may comprise a plurality of bi-directional cell balancers. For example, the balancing module may comprise six such cell balancers. Each balancer uses a predetermined transformer ratio to transfer charge between a cell and an adjacent sub-stack (in either direction). For example, the transformer ratio can be simply 1:1.

The bi-directional balancing of circuit 500 can provide power efficient cell to sub-stack and sub-stack to cell charge transfer regardless of whether the battery pack is being charged or discharged. Further, each cell within a sub-stack (e.g., cells 1 to 6) can be balanced simultaneously. Simultaneous operation reduces balancing time. Indeed, during the time it may take to balance a single cell, a plurality of cells within a sub-stack can be balanced. In one embodiment, simultaneous balancing can occur with other sub-stacks (e.g., cells 6 to 12) as well.

In one embodiment, the first terminal of the primary side of a transformer (e.g., 520) of each cell may be connected directly across the cell to be balanced (e.g., 502). The second terminal of the primary side of a transformer is in series with a transistor (e.g., a power FET 522) and a current sense resistor (e.g., 524). The secondary side of each transformer (e.g., 521) may be connected to an adjacent cell. For example, the adjacent cell may be further up in the stack in series with a transistor (e.g., a power FET 523) and secondary side current sense resistor (e.g., 525)). The current sense resistor (e.g., 525) of each secondary side transformer winding (e.g., 521) may be referenced to the lowest voltage cell in the sub-stack. The maximum voltage connection on the secondary side may be limited only by the breakdown voltage of the secondary side transistor 523.

Further, the ON/OFF state and charge current direction control may be independent for each balancer. The state and direction may be communicated to each IC through a common stackable serial port 530. For example, a daisy chained stackable interface may allow all balancers to be controlled through a single I/O port 530 without restriction on the number of cells in a series connected battery stack. This feature is discussed in more detail later.

Figure 7:
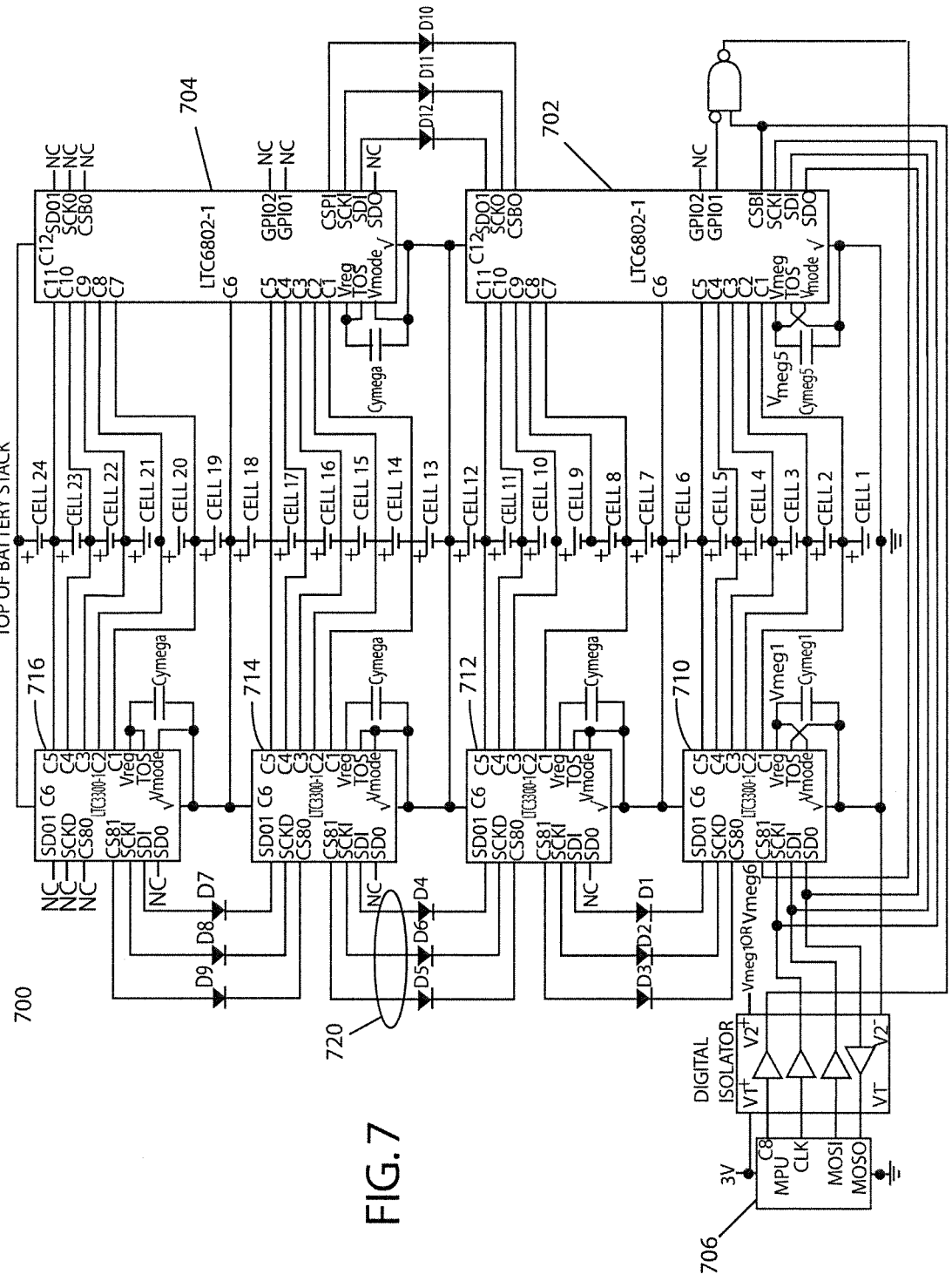
FIG. 7 is a system diagram illustrating stackable serial communication, consistent with an embodiment of the invention.

FIG. 7 is a simplified system diagram illustrating stackable serial communication, consistent with an embodiment of the invention. In order to determine charge transfer requirements, at least one monitor module (e.g., 702 and 704) in connection with a microprocessor 706, may first determine the average SOC for each cell corresponding to each sub-stack (i.e., 710 to 716). For example, the voltage of a cell may provide a measure of the SOC of the cell. If all cells have similar capacity, the cell with the lowest SOC (i.e., weakest cell) may receive additional charge from its sub-stack as a one time correction. For example, the entire sub-stack may be used to provide charge to the weaker cell within its sub-stack. Thereafter, the entire sub-stack may cycle normally without any additional adjustments.

However, if a cell has a capacity different from normal cells (e.g., is damaged or degraded), this cell may be charged at a different rate than the normal cells. That is because a cell with less capacity charges faster than a normal cell (reaching a higher voltage faster and a lower voltage faster than a normal cell). For example, with balancing, during a charging cycle of a sub-stack, the weaker cell may receive less charge than the normal cells, thereby allowing all cells within a sub-stack to achieve the same voltage at the end of the charge cycle.

In one embodiment, to preserve battery life, a cell may be considered sufficiently charged at 70% capacity and sufficiently discharged at 30% capacity. Accordingly, during a charge cycle the normal cells and the defective cell of a sub-stack would be charged to 70% capacity at the same time. Similarly, during a discharge cycle, the normal cells and the defective cell would discharge to 30% at the same time.

As discussed above, monitor modules 702 and 704 may monitor the SOC of each cell. Each balancer in the system (i.e., 710 to 716) may be controlled by a microprocessor 706 using a single stackable communication interface 720. This daisy chained stackable interface allows balancers 710 to 716 to be controlled through a single communication port (I/O interface 720), irrespective of the number of cells in a series connected battery stack. Accordingly, a theoretically unlimited number of cells may be supported from a single communication port without the need for additional digital isolators.

Figure 6:
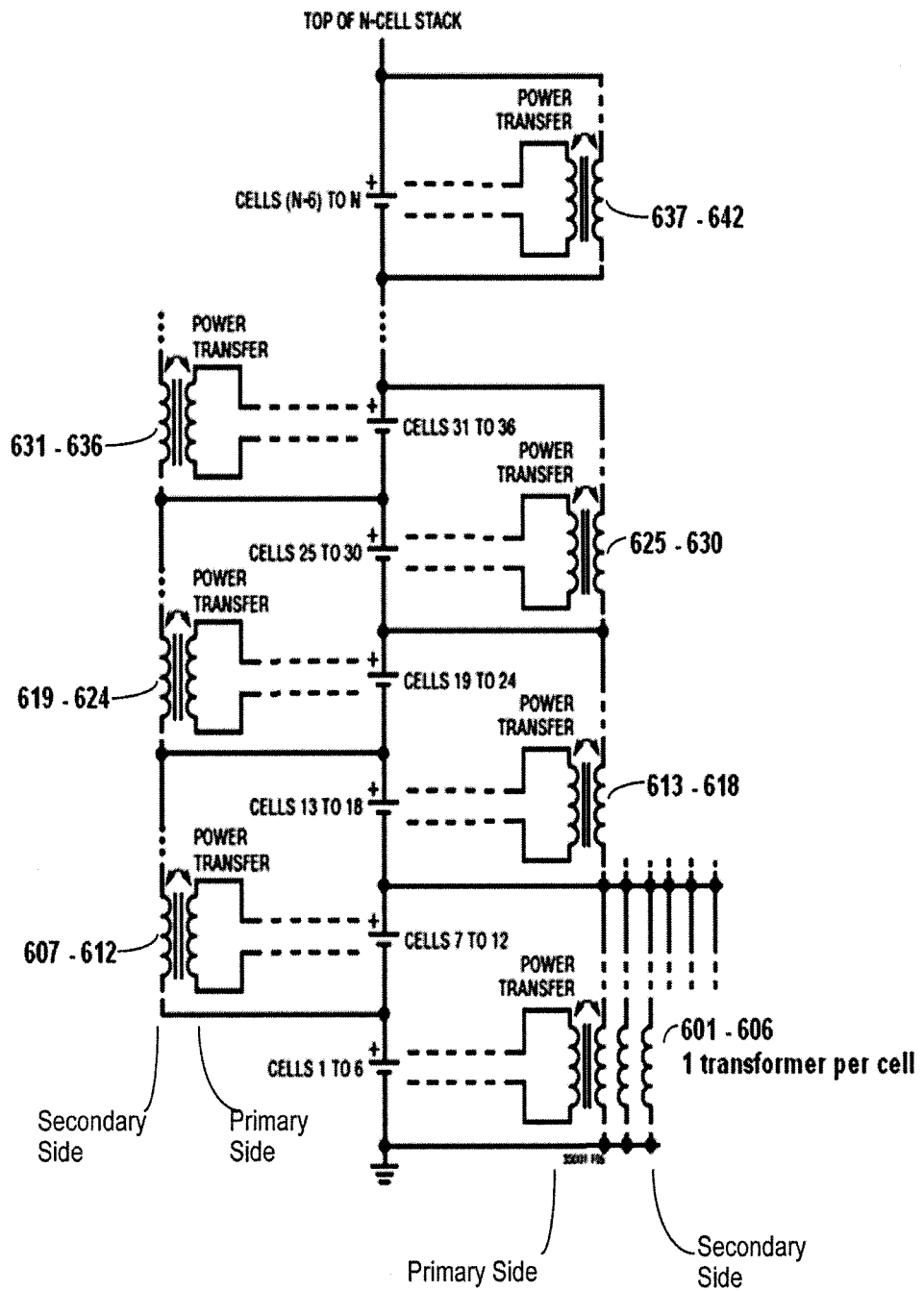
FIG. 6 Illustrates a circuit with transformer connections for balancing a plurality of interleaved battery stacks, consistent with an embodiment of the invention.

FIG. 6 Illustrates a circuit with transformer connections for balancing a plurality of battery sub-stacks, consistent with an embodiment of the invention. Each sub-stack of cells (e.g., cells 1 to 6) is connected in series with an adjacent sub-stack (e.g., cells 7 to 12). Each cell within a sub-stack has a corresponding primary side of a transformer associated with it. By way of example, the primary side connections for transformers 601 to 606 are across each of the six cells in the lowest voltage sub-stack, wherein the primary side of transformer 601 is across cell 1, the primary side of transformer 602 is across cell 2, etc. Further, each corresponding secondary side of the transformer connection is across the same sub-stack (i.e., cells 1-6) plus the adjacent higher voltage sub-stack (i.e., cells 7-12) in an interleaved configuration.

Accordingly, in this example, cells 7 to 12 are each associated with transformers 607-612. The coils of the secondary side of transformers 607-612 are associated with cells 7 to 12 and cells 13 to 18. In this example, assuming the average SOC of cells 25 to 30 is strong while the average SOC of cells 7 to 12 is weak, charge from cells 25 to 30 (i.e., strong sub-stack) can be transferred to cells 7 to 12 (i.e., weak sub-stack) by the following steps:

1. Charge cells 19 to 24: The secondary side of transformers 619-624 transfers charge from the strong sub-stack to cells 19 to 24 (i.e., first intermediary sub-stack) via its primary coils.

2. Charge cells 13 to 18: The secondary side of transformers 613-618 transfers charge from the first intermediary sub-stack to cells 13 to 18 (i.e., second intermediary sub-stack).

3. Charge cells 7 to 12: The secondary side of transformers 607-612 transfers charge from the second intermediary sub-stack to the weak sub-stack.

Accordingly, by the primary side of the transformer straddling cells within each sub-stack and the secondary side straddling a plurality (e.g., 2) of sub-stacks in an interleaved manner, any sub-stack can share the charge of another sub-stack, even if the other sub-stack is not adjacent to the weak (or strong) sub-stack.

As to interleaving sub-stacks, examples provided herein illustrate secondary sides of transformers reaching across two sub-stacks. Those skilled in the art will appreciate, in view of the specification, that the secondary sides of transformers can reach across as many adjacent sub-stacks as desired. For Example, reaching across several sub-stacks may improve charge redistribution on a per balancer basis. In this regard, charge return current from a discharging cell is redistributed to a greater number of secondary side cells. Similarly, charge supply current for a cell being charged is sourced from a greater number of adjacent cells. Accordingly, the "discharging" of the secondary side sub-stacks is minimized. Thus, the other cells are impacted as little as possible when a particular cell is balanced. In one example, this is achieved by increasing the number of secondary side cells, Further, although six cells have been illustrated per sub-stack, the number of cells can be any number N, where N is>2, The same concept described above in connection with balancing a plurality of sub-stacks can be applied to balancing the cells within a single sub-stack. By way of example, assuming that cell 1 (502) in FIG. 5 is a weak cell in the sub-stack comprising cells 1 to 6, normal cells 2 to 6 can provide part of their charge to weak cell 1 through their respective transformers.

Charge transfer is accomplished by alternately turning the power switches (e.g., 522, 523) connected to the transformer primary and secondary sides ON and OFF. This allows current to ramp up in one winding of the transformer (charge supply side) when its associated series power switch is ON, and then ramp down in the other winding (charge return side) when the charge supply side switch is turned OFF due to the stored energy in the transformer core. At this point, the power switch on the charge return side of the transformer (connected either to a cell or to a sub-stack) is turned ON to provide a low impedance path for the return current to flow. Return current may also conduct through the body diode of the return side power switch. Thus, current flows even if the return side switch is not turned ON. This cycle repeats as needed until sufficient charge has been transferred as determined by the monitoring system.

Cycle by cycle charge transfer control for each balancer is accomplished by directly sensing the transformer winding current through a series sense resistor (e.g. 524, 525). The charge supply side power switch is turned OFF as soon as the current ramping through the sense resistor reaches a predetermined peak voltage (i.e., the current flowing through the charge supply side transformer winding, power switch and sense resistor reaches a predetermined max value). Charge return side current is allowed to flow until the return side current has decayed to zero (as may be indicated by zero voltage drop across the return side sense resistor), and then the cycle may repeat. Alternatively, current may be allowed to flow through the supply side power switch for a pre-determined amount of time. The peak current in this instance would be determined by the supply side ON time and the supply side winding inductance. As before, the return side current could be allowed to flow until it decayed to zero or for a pre-determined amount of time sufficient to allow the current to decay to zero.

Although a single defective cell is discussed in the examples above, those skilled in the art will realize, in view of the disclosure, that the same concepts disclosed herein can be applied to a plurality of defective cells in the same sub-stack.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

The invention claimed is:

1. A battery balancing system comprising:
    at least one sub-stack, each sub-stack comprising a plurality of cells connected in series;
    a balancing module for each sub-stack, the balancing module comprising an independent bidirectional balancer for each cell in the sub-stack;
    a monitor module configured to sense a SOC of each cell in each sub-stack;
    a microprocessor configured to determine an average SOC of the cells for each sub-stack; and
    a daisy chained stackable serial port configured to transmit information to each balancing module, wherein each balancing module is configured to:
        provide an additional charge to any weak cell from its sub-stack during a discharging of the battery, and remove additional charge from any weak cell and provide it to its sub-stack during a charging of the battery; and
        remove an additional charge from any strong cell and provide it to its sub-stack during the discharging of the battery, and provide an additional charge from the sub-stack to any strong cell during the charging of the battery.

2. The battery balancing system of claim 1, wherein any number of sub-stacks can be stacked in series and controlled using a common stackable serial control.

3. The battery balancing system of claim 1, wherein each sub-stack comprises six series connected cells.

4. The battery balancing system of claim 1, wherein every strong or weak cell in a sub-stack is balanced simultaneously.

5. The battery balancing system of claim 4, wherein every strong or weak sub-stack is balanced simultaneously.

6. The battery balancing system of claim 1, wherein any number of sub-stacks are balanced simultaneously.

7. The battery balancing system of claim 1, further comprising:
    at least one transformer having a primary side and a secondary side, wherein each transformer comprises a separate coil for each cell on the primary side and a single coil corresponding to a plurality of adjacent sub-stacks on the secondary side;
    each coil including a first terminal and a second terminal, wherein each coil on the primary side has a transistor and a resistor in series with the second terminal;
    wherein each coil on the secondary side has a transistor and a resistor in series with a second terminal;
    wherein the first terminal of each coil on the primary side of each transformer is connected to a cell;
    wherein the first terminal of the coil on the secondary side of each transformer is connected to a first terminal of a secondary side of a transformer of an adjacent independent bidirectional balancer; and
    wherein the resistor in series with a second terminal of the secondary side of each transistor is connected to the lowest voltage of its sub-stack.

8. The battery balancing system of claim 7, wherein:
    each transformer is configured to transfer charge between its sub-stack and an adjacent sub-stack;
    the primary side of each transformer is connected to its respective cell in its sub-stack and the secondary side to its sub-stack and an adjacent sub-stack; and
    the connection of each transformer to its respective adjacent sub-stack is interleaved.

9. The battery balancing system of claim 7, wherein a maximum voltage across the secondary side of each coil is limited by a breakdown voltage of its respective series transistor.

10. The battery balancing system of claim 1, wherein the balancing module is configured to allow each cell within a sub-stack to achieve a same voltage at a first predetermined point in a charge cycle and a second predetermined point in a discharge cycle.

11. The battery balancing system of claim 10, wherein:
    the first predetermined point is at 70% capacity of the cells within the sub-stack; and
    the second predetermined point is at 30% capacity of the cells within the sub-stack.

12. A method of balancing a battery comprising:
    sensing an SOC of each cell in every sub-stack;
    calculating an average SOC for every sub-stack;
    determining a strength of each cell in every sub-stack in relation to the average SOC in every sub-stack;
    simultaneously providing an additional charge to weak cells from their respective sub-stack during a discharging of the battery;
    simultaneously removing an additional charge from weak cells to their respective sub-stack during a charging of the battery;
    simultaneously removing an additional charge from strong cells to their respective sub-stack during a discharging of the battery; and simultaneously providing an additional charge to strong cells from their respective sub-stack during a charging of the battery.

13. The method of claim 12 further comprising:
transferring charge between one sub-stack to another sub-stack of the battery through at least one intermediary sub-stack in an interleaved manner.

14. The method of claim 12 further comprising allowing each cell within a sub-stack to achieve a same voltage at a first predetermined point in a charge cycle and a second predetermined point in a discharge cycle.

15. The method of claim 14, wherein:
the first predetermined point is at 70% capacity of the cells within the sub-stack; and
the second predetermined point is at 30% capacity of the cells within the sub-stack.

* * * * *